April 25, 1944.  R. B. COTTRELL  2,347,628
TYING AND SQUARING MEANS FOR CAR TRUCKS
Filed May 20, 1941  3 Sheets-Sheet 1
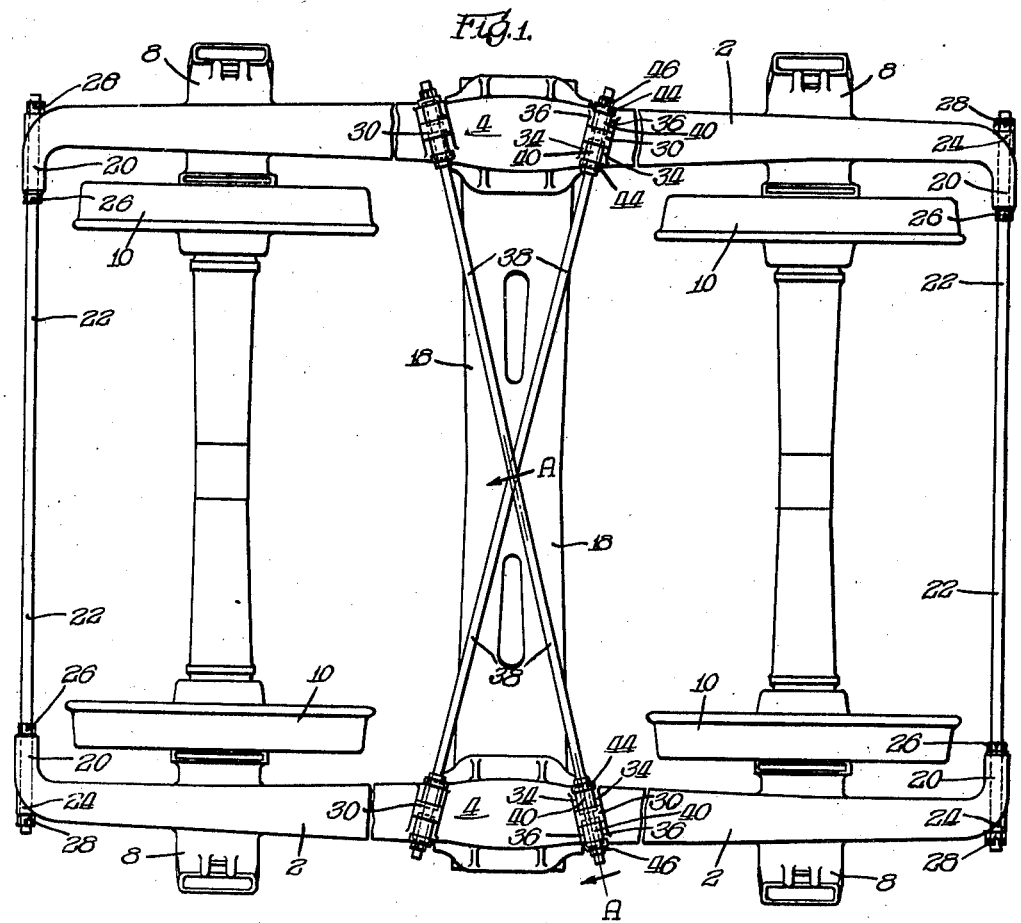
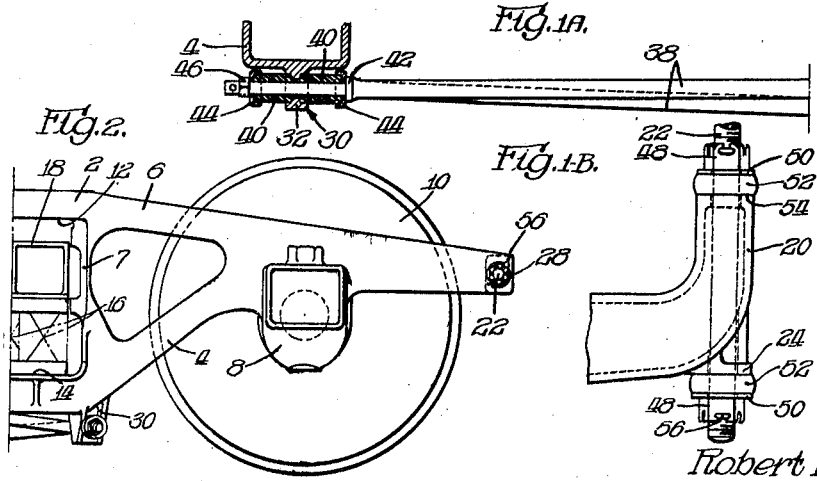
INVENTOR.
Robert B. Cottrell
BY 
Atty.

April 25, 1944.    R. B. COTTRELL    2,347,628
TYING AND SQUARING MEANS FOR CAR TRUCKS
Filed May 20, 1941    3 Sheets-Sheet 2
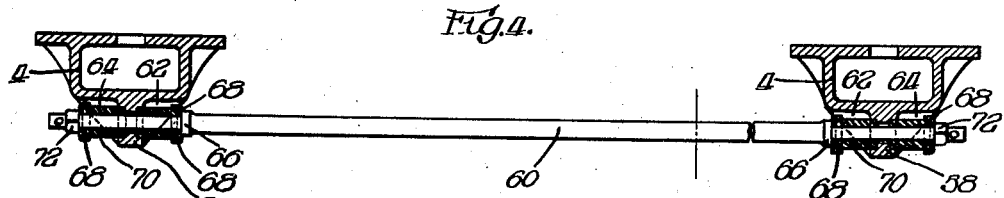
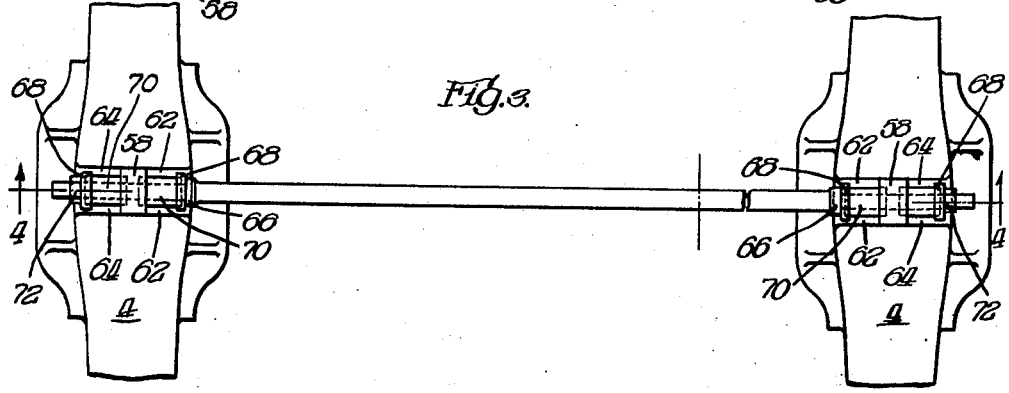
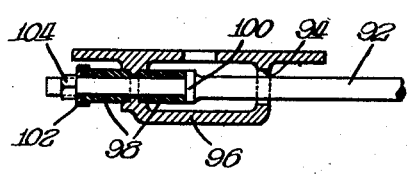
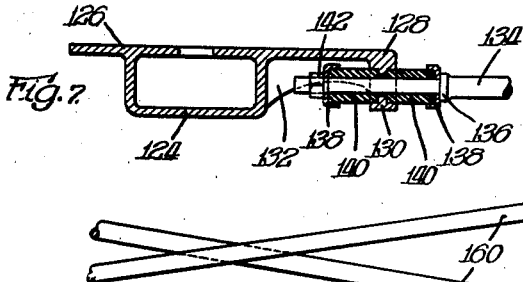
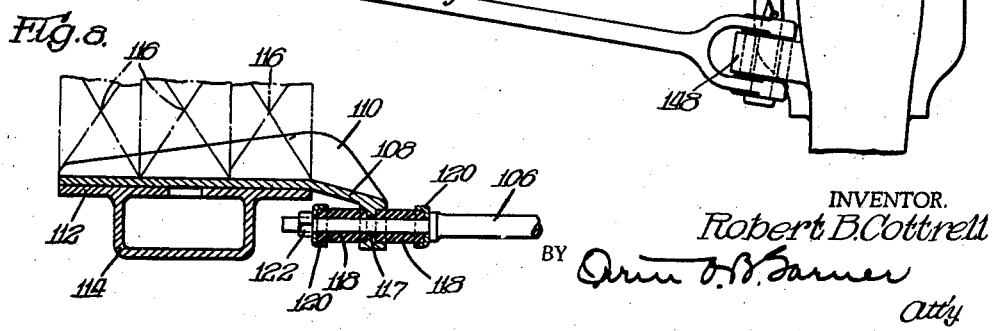
INVENTOR.
Robert B. Cottrell April 25, 1944.                    R. B. COTTRELL                    2,347,628
              TYING AND SQUARING MEANS FOR CAR TRUCKS
                     Filed May 20, 1941          3 Sheets-Sheet 3

INVENTOR.
Robert B. Cottrell
BY
atty.

Patented Apr. 25, 1944

2,347,628

UNITED STATES PATENT OFFICE 2,347,628

TYING AND SQUARING MEANS FOR CAR TRUCKS

Robert B. Cottrell, Chicago, Ill., assignor to American Steel Foundries, Chicago, Ill., a corporation of New Jersey Application May 20, 1941, Serial No. 394,327

17 Claims. (Cl. 105—208.2)

My invention relates to railway car trucks and particularly four wheel railway car trucks of designs commonly used in freight equipment.

The general object of my invention is to devise a novel form of securing the truck parts in such a manner as to maintain them in proper squared relationship.

It is well known that at the present time freight car speeds have been greatly increased as compared with those of earlier periods. Freight train speeds up to eighty miles per hour are now permitted. With such speeds it is desirable to maintain the truck parts in more carefully defined relationship to one another than is necessary where speeds are more moderate. The general object of my invention is to afford an arrangement suitable for application to existing types of freight car trucks which will stabilize the relationships of the parts, namely, the spaced side frames and connecting bolster, to afford maximum stability under conditions of high speed.

A specific object of my invention is to afford a plurality of parallel resiliently connected ties between the spaced side frames of such a railway car truck.

A different object of my invention is to arrange certain of the resilient ties between said spaced side frames in diagonal relationship with respect to one another in order to afford maximum stability. My invention comprehends an arrangement wherein a plurality of resilient means may be afforded at each end of each tie means, certain of said resilient means being under compression when the parts move toward one another and other of said resilient means being under compression when a spreading movement occurs between said parts.

My invention further contemplates such an arrangement as that described wherein relatively simple means for securing said tying means to the spaced frames may be afforded, said securing means being adapted to be readily replaced as may be required.

Figure 1 is a plan view of a railway car truck embodying my invention, a portion thereof being shown in bottom plan in order to clarify the showing thereof.

Figure 1A is a fragmentary sectional view through the truck structure shown in Figures 1 and 2, the section being taken in the diagonal plane indicated substantially by the line A—A of Figure 1.

Figure 1B is a fragmentary view corresponding to a view of an end of one of the side frames in Figure 1 and showing a modified form of connection.

Figure 2 is a fragmentary side elevation of the car truck structure shown in Figure 1, only one-half thereof being shown inasmuch as the arrangement is similar at opposite ends thereof.

Figure 3 is a fragmentary bottom plan view showing an alternate form of connecting an intermediate tie bar.

Figure 4 is a sectional view through the truck structure shown in Figure 3, the section being taken substantially in the transverse vertical plane indicated by the line 4—4 of Figure 3.

Figure 5 is a fragmentary sectional view corresponding in general to the sectional view of Figure 4 and showing an alternate form of connection for the tie bar.

Figures 6 and 7 correspond in general to the showing of Figure 5 but illustrate alternate methods of connection.

Figure 8 is also comparable to the showing of Figure 5 but illustrates a still further modification for connection of a tie bar.

Figure 9 is a fragmentary bottom plan view of a car truck comparable to the showing of Figure 1 but illustrating a different manner of connecting double tie rods.

Figure 10:
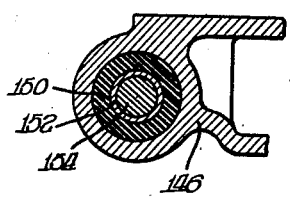
Figure 11:
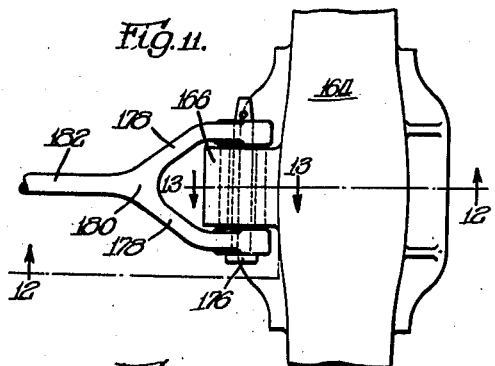
Figure 13:
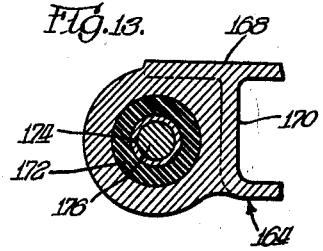
Figure 12:
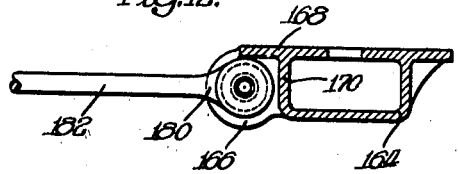

Figure 10 is a sectional view through a tie rod connection as shown in Figure 9, the section being taken substantially in the diagonal plane indicated by the line 10—10 of Figure 9. Figures 11, 12 and 13 illustrate a modified form of connection for an intermediate tie rod, Figure 11 being a fragmentary bottom plan view, Figure 12 a sectional view taken substantially in the transverse planes indicated by the line 12—12 of Figure 11, and Figure 13 being a fragmentary sectional view taken in the vertical transverse plane indicated by the line 13—13 of Figure 11.

Figure 14:
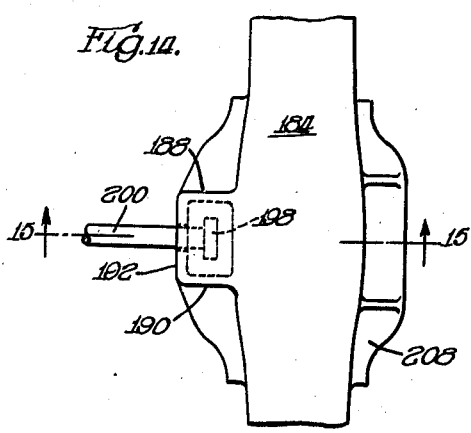
Figure 15:
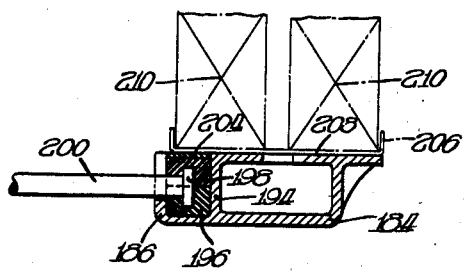
Figure 16:
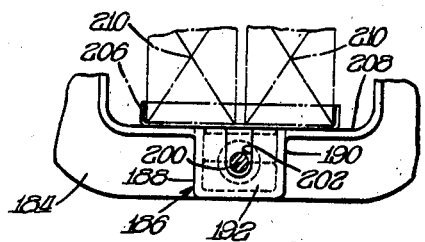

Figures 14, 15 and 16 present a further modified form of connection for an intermediate tie rod, Figure 14 being a fragmentary bottom plan thereof, Figure 15 a sectional view in the transverse plane substantially as indicated at 15—15 in Figure 14, and Figure 16 is a fragmentary side elevation.

Describing in detail my novel arrangement and referring first to the modification shown in Figures 1 to 4 inclusive, my novel truck arrangement comprises spaced truss type side frames 2, 2, each of integral truss type with tension member 4, compression member 6, spaced columns, 7, 7 and journal boxes 8, 8 forming the conventional means of connection to spaced wheel and axle assemblies 10, 10, each of said side frames having a central bolster opening 12 in which may be supported on the spring seat 14 springs diagrammatically indicated at 16, 16 affording support for the bolster 18 which projects into said openings and ties said frames together at points above the axle level.

Each side frame 2 is extended beyond the integral journal boxes 8, 8 and formed at its extremities with inturned brackets 20, 20 affording convenient means of connection for the end tie bars 22, 22. Each bracket 20 is formed with a shoulder 24 in which may be formed a rod opening aligned with a similar rod opening at the extremity of the bracket 20 and said rod 22 may be threaded a sufficient distance at each end to permit the positioning of the inboard securing nut 26 as well as the outboard securing nut 28.

On each side frame approximately beneath each guide column 7 may be formed an integral diagonally arranged depending bracket 30, said bracket having a central web 32 reinforced by spaced integral inboard ribs or flanges 34, 34 continuous with spaced integral outboard ribs 36, 36 (Figure 1), said brackets serving as securing means for the ends of the crossed tie bars 38, 38. The manner of securing each tie bar 38 to the adjacent bracket is best seen in the sectional view of Figure 1A wherein it may be noted that the central web 32 of the bracket 30 is recessed at opposite sides to receive and position a resilient washer 40 on each side of said web 32, each of said washers 40 having general cylindrical form and accommodating the end of the associated tie bar 38. Each tie bar 38 is formed with a shoulder 42 adjacent each end against which may seat a spring cap 44 affording abutment for the adjacent resilient member 40 which is sleeved around the tie rod 38 and confined between the web 32 of the bracket 30 and the opposed spring cap 44. A similar resilient member 40 is sleeved over the end of the tie bar which extends through said bracket to the outboard side of the frame and may be secured in position by means of a similar spring cap 44 and a threaded nut 46. By this means a resilient connection is afforded for the end of each tie bar which substantially stabilizes the relative position of the spaced side frames, preventing too great play therebetween while at the same time permitting the natural vibrations to be absorbed by said resilient connections which permit some degree of play between each tie bar 38 and the bracket 30 to which it is secured. It may be noted that the tie bars 22, 22 at opposite ends of the truck are positioned above the axle level whereas the crossed tie bars 38, 38 adjacent the transverse center line of the truck are located well below the axle level so that when all of said tie bars are secured in normal position, a great stabilizing effect is secured on the side frames to maintain them in proper alignment, preventing their getting out of square and likewise preventing undesirable excessive side sway of said frames. The location of said end tie bars 22, 22 well above the axle level as compared with the location of the intermediate tie bars 38, 38 well below said axle level affords a particularly desirable arrangement.

In Figure 1B I have shown a modified arrangement for connecting the end tie bars 22, 22. In this modified arrangement a resilient connection is afforded for each end of each tie bar 22 by inserting between the inboard securing threaded nut 48 a washer 50 affording a seat for one end of the resilient pad 52, the opposite end of which may be seated at 54 against the inboard face of the bracket 20 and at the extremity of the tie bar a similar resilient connection may be provided by seating against the shoulder 24 a similar resilient pad 52 with an associated washer 50 and securing threaded nut 48. Each of the threaded nuts 48 may be of castellated form with slots which may be aligned with openings in the adjacent tie bar to permit the use of a cotter key as at 56 (Figure 1B).

In Figures 3 and 4 I have shown an alternate method of connecting the intermediate portions of the spaced frames wherein I use a single tie bar below the axle level instead of the crossed tie bars in the modification shown in Figures 1 and 2. As illustrated in Figures 3 and 4 the tie bar connects the lowermost portions of the frame by means of depending brackets which are integrally formed with the tension member 4, each of said brackets being designated generally 58 and having the general form and structure of the depending brackets previously described with a central web longitudinally of the frame perforated for reception of the adjacent end of the tie rod 60, said bracket 58 being reinforced by integral transversely arranged spaced inboard webs or gussets 62, 62 and spaced outboard webs 64, 64 between which may extend the end of said tie bar 60. The said tie bar end is afforded a shoulder 66 against which may seat the spring cap 68 serving to confine one end of the resilient pad 70, the opposite end of which may be confined in a recess formed in the central web of the bracket 58. The opposite face of said central web may likewise be recessed for reception of a similar resilient pad or bushing 70, the opposite end of which may be confined by a spring cap 68 and all of said parts held in proper relationship by the securing nut 72. This single tie bar connected at the bottom of the tension member as described will prevent relative lateral sway between the side frames and will assist somewhat in squaring the truck but the squaring effect is less positive than that afforded by the use of two crossed tie bars as in the embodiment previously described.

Alternate manners of connecting each tie bar end are illustrated in Figures 5, 6, 7 and 8. As shown in Figure 5 the tie bar 74 is shouldered at 76 to seat the spring cap 78 housing one end of the resilient bushing 80, the opposite end of which is seated as at 82 in a recess formed on the inboard face of the inboard web 84 of the tension member 86 of the side frame and the end of said tie rod 74 extends through an aligned opening in the outboard web 88 of said box section tension member and on the outboard face of the web 88 may be seated a similar resilient bushing 80, the opposite end of which may be housed in the spring cap 78 and all of said parts secured in position by the threaded nut 90. This structure is most suitable for use on a side frame where the tension member is already lowered to a position close to the top of the rail so that the use of an additional depending bracket is impracticable. In such case the tension member itself is placed sufficiently below the axle level to secure similar results.

The tie arrangement shown in Figure 6 permits the tie bar 92 unrestricted passage through an opening 94 formed on the inboard web of the box section tension member 96, said opening being aligned with a smaller opening formed in the outboard web of said tension member at opposite sides of which may be seated the resilient pads or bushings 98, 98, the inboard pad being seated against a shoulder 100 on said rod 92 and the outboard resilient member 98 having one end confined by the spring cap 102 which is secured in position by the threaded nut 104. By means of such a connection I am able to tie the intermediate rods at points outboard the longitudinal center line of the frame while it may be noted that the end tie rods are secured effectively somewhat inboard of said vertical longitudinal plane bisecting each side frame so that added stability may be secured by this means.

In the modification shown in Figure 7 the box section tension member 124 has the usual spring seat portion 126 which is extended in an inboard direction to form the bracket 128 with the downturned flange 130 reinforced by the transverse web 132 integrally joining said flange with the inboard web of the box section tension member. The tie rod 134 may be connected to the downturned flange 130 of the bracket 128 in manner identical to those previously discussed, said tie rod having a shoulder 136 for abutment of the spring cap 138 which receives one end of the resilient bushing 140, the opposite end of which is recessed in the inboard face of the flange 130 and the end of said tie rod 134 extends through an opening in the flange 130 where it may receive the resilient bushing 140 outboard of said flange, said outboard bushing 140 having its outboard end seated against a spring cap 138 with the whole assembly secured by the retaining nut 142.

In the arrangement shown in Figure 8 the intermediate tie bar 106 may be connected to a special spring plate 108 reinforced by spaced upstanding flanges 110, 110, said spring plate being secured on the spring seat 112 forming a part of the box section tension member 114 and being maintained in relation thereto by any convenient means such as interengaging lugs (not shown), said spring seat or plate affording support for the superposed springs diagrammatically indicated at 116, 116. In this arrangement the spring plate 108 projects inboard the spring seat 112 to afford connection as at 117 with said rod 106, the connection at 117 being similar in detail to the connections previously shown and including spaced resilient bushings 118, 118 confining spring caps 120, 120 and a securing nut 122 threaded on the end of the rod 106.

The modifications shown in Figures 7 and 8 afford connection of the intermediate tie rod at substantially identical points in the truck structure but the modification of Figure 7 is particularly suitable for new trucks where the brackets for the rod may be cast integral with the tension member, whereas the modification of Figure 8 is more suitable for existing trucks wherein a new spring plate 110 may be inserted in order to provide for the tie rod 106.

In Figures 9 and 10 I show a modified form of connecting the diagonally arranged intermediate tie rods to the tension member of the side frame. In this arrangement the side frame tension member 144 is shown in bottom plan and on the inboard face thereof are afforded integral diagonally arranged spaced brackets 146 and 148, each bracket being cored out to form a cylindrical opening. Within each cylindrical opening may be pressed a resilient bushing 150, said bushing having been previously vulcanized on its inner circumference to the split metal bushing 152, said metal bushing 152 affording a convenient wear surface for the securing pin 154 which extends through aligned openings formed in the spaced legs 156, 156 of the jaw end 158 of the adjacent tie bar 160. Each securing pin 154 may be held in assembly by means of a cotter positioned as at 162. I may utilize this form of connection for the diagonally arranged intermediate tie rods instead of the connecting arrangement shown in Figures 1 and 2 where it is impracticable to extend a depending bracket from the tension member.

An alternate manner of connecting the single intermediate tie bar is shown in Figures 11, 12 and 13 wherein the box section tension member 164 may be formed with an integral bracket 166 integrally joining the spring seat portion 168 and the inner web 170 of said box section tension member 164 on the transverse center line of the frame. The said bracket 166 may be generally cylindrical in form to afford convenient housing for the resilient member 172 and said resilient member 172 may be pressed therein after having been vulcanized to the split metal bushing 174 which will serve as a wear plate for the securing pin 176. The said securing pin 176 may extend through aligned openings in the spaced legs 178, 178 of the jaw end 180 of the tie bar 182, thus securing said tie bar to said bracket and affording a resilient connection between said bracket and tie bar. I may utilize this form of connection for a single intermediate tie rod in place of that shown in Figures 3 and 4 where it is impractical to utilize a bracket depending from the bottom of the side frame tension member.

In Figures 14, 15 and 16 I have shown a further method of resiliently connecting an intermediate tie rod between spaced side frames. In this modification the box section tension member 184 may have integrally formed on the inboard face thereof the rectangular housing 186 defined by the spaced transverse webs 188 and 190, by the longitudinal web 192 and by the vertical web 194 forming one wall of the box section tension member. In said housing 186 may be confined resilient material generally designated 196, said resilient material being formed in upper and lower halves with a cavity for reception of the rectangular end portion 198 of the tie rod 200 which may be received in the vertical slot 202 (Figure 16) formed in the inboard wall 192 of said housing. The housing 186 may be formed with an open top in which may be positioned a closure plate 204 which may underlie the spring plate 206 normally positioned on the spring seat 208 and serving as retaining means for the springs diagrammatically indicated at 210, 210. In this arrangement the normal pressure of the superposed spring group will maintain the closure plate 204 in position and the end of the tie bar 200 is closely confined within the resilient material 196 which fills the housing 186. By this means the opposite ends of the tie rod may be secured to the spaced tension members of the side frames in a resilient manner which will permit some slight play as normally is required.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a railway car truck, spaced truss side frames having tension and compression members and wheel connecting means, supporting wheel and axle assemblies, a bolster connecting said side frames, each of said tension members having a box section with spaced diagonally arranged brackets on the inboard face thereof below the axle level, a plurality of tie rods resiliently crisscross connected between said brackets, and tie rods resiliently connected between the ends of said frames.

2. In a railway car truck, spaced truss side frames having tension and compression members and wheel connecting means, supporting wheel and axle assemblies, brackets on the extremities of said frames above the axle level, tie rods resiliently connecting said brackets at each end of the truck, a bolster connecting said side frames, each of said tension members having a box section with inboard and outboard webs, and a tie rod securing together said tension members, said last mentioned tie rod having its opposite ends pivotally and resiliently connected to the inboard webs of the respective tension members.

3. In a railway car truck, spaced side frames and an intervening bolster, supporting wheel and axle assemblies, each of said frames comprising spaced reversely arranged diagonal brackets on the inboard face thereof below the axle level, a plurality of tie rods resiliently crisscross connected between said brackets, and a tie rod at each end of said truck connected between corresponding portions of opposite frames, the connection of said last-mentioned tie rod with each frame comprising a plurality of spaced resilient means.

4. In a railway car truck, spaced truss side frames having tension and compression members and wheel connecting means, supporting wheel and axle assemblies, brackets on the extremities of said frames, tie rods resiliently connecting said brackets at each end of the truck, a bolster connecting said side frames, each of said tension members having a box section with spaced brackets on the inboard face thereof below the axle level, and a plurality of tie rods resiliently crisscross connected between said last-mentioned brackets.

5. In a railway car truck, spaced truss side frames having tension and compression members and wheel connecting means, supporting wheel and axle assemblies, each of said tension members having a box section with spaced brackets on the inboard face thereof, a plurality of tie rods resiliently crisscross connected between said brackets, said frames having inturned end brackets with transversely aligned openings, and a tie rod at each end of the truck resiliently connected through said openings.

6. In a railway car truck, spaced side frames and an intervening bolster, a bracket formed on the inboard face of each frame below the axle level, a rigid member extending between said frames, means resiliently connecting said rigid member to each of said brackets, inturned brackets on opposite ends of each frame with transversely aligned openings there-through, and a rigid tie bar resiliently connected in the openings at each end of the truck, each of said last-mentioned resilient connections comprising a plurality of resilient means spaced laterally of the truck.

7. In a railway car truck, spaced side frames and an intervening bolster, tie rods crisscross connected between said frames beneath said bolster, inturned brackets on the ends of said frames with transversely aligned openings, and tie bars at respective ends of the frames resiliently secured at spaced points in each of the adjacent openings.

8. In a railway car truck, spaced side frames and an intervening bolster, a plurality of reversely arranged diagonal brackets formed on the inboard face of each frame, rigid members crisscross connected between said frames to the respective brackets, and tie bars resiliently connected between adjacent ends of said frames.

9. In a railway car truck, spaced side frames and an intervening bolster, spaced supporting wheel and axle assemblies, brackets formed on the inboard face of each frame below the axle level, a plurality of rigid members resiliently crisscross connected between said brackets, and tie rods resiliently connected between said frames at the extremities thereof and above the axle level.

10. In a railway car truck spaced side frames and an intervening bolster, spaced supporting wheel and axle assemblies, brackets formed on the inboard face of each frame below the axle level, a plurality of rigid members resiliently and pivotally crisscross connected between said brackets, and tie rods resiliently connected between said frames at the extremities thereof and above the axle level.

11. In a railway car truck, spaced side frames and an intervening bolster, spaced supporting wheel and axle assemblies, reversely arranged diagonal brackets formed on the inboard face of each frame below the axle level, a plurality of rigid members resiliently crisscross connected between said brackets, inturned brackets on the ends of said frames with transversely aligned openings, and a tie bar connected in the aligned openings in each end of the truck, each of said last-mentioned tie bars having a plurality of laterally spaced resilient means supporting its connection to each side frame.

12. In a railway car truck, spaced side frames and an intervening bolster, spaced supporting wheel and axle assemblies, brackets formed on the inboard faces of said frames below the axle level, a plurality of rigid members resiliently crisscross connected between said brackets, and tie rods resiliently connected between said frames at the extremities thereof and above the axle level.

13. In a railway car truck, spaced side frames and an intervening bolster, rigid members extending between corresponding ends of said frames and between corresponding intermediate points of said frames, and a resilient connection between each member and each of said frames, each of said resilient connections comprising a plurality of laterally spaced resilient means adapted to resist in compression movement of said frames toward and away from each other.

14. In a railway car truck, spaced side frames and an intervening bolster, supporting wheel and axle assemblies, brackets on said frames below the axle level, rigid members extending crisscross between said frames, pivot means connecting said rigid means to respective brackets, and resilient means sleeved on each pivot means and received within the associated bracket.

15. In a railway car truck, spaced side frames and an intervening bolster, inboard brackets on each of said frames, rigid members crisscross connected between said brackets, said frames having inturned ends with transversely aligned openings, and a tie rod at each end of the truck resiliently connected in the adjacent openings.

16. In a railway car truck, spaced side frames and an intervening bolster, supporting wheel and axle assemblies, rigid members extending between the ends of said frames above the axle level, intermediate rigid members extending crisscross between said frames and below the axle level, and a resilient connection between each member and each frame, each of said connections comprising resilient means adapted to resist movement of said frames toward and away from each other.

17. In a railway car truck, spaced side frames and an intervening bolster, supporting wheel and axle assemblies, rigid members extending between the ends of said frames above the axle level, intermediate rigid members extending crisscross between said frames below the axle level, and a resilient connection between each member and each frame.

ROBERT B. COTTRELL.